(No Model.)
E. S. McCLELLAN.
AIR INLET AND SEAL FOR WASTE PIPES AND TRAPS.
No. 339,800. Patented Apr. 13, 1886.
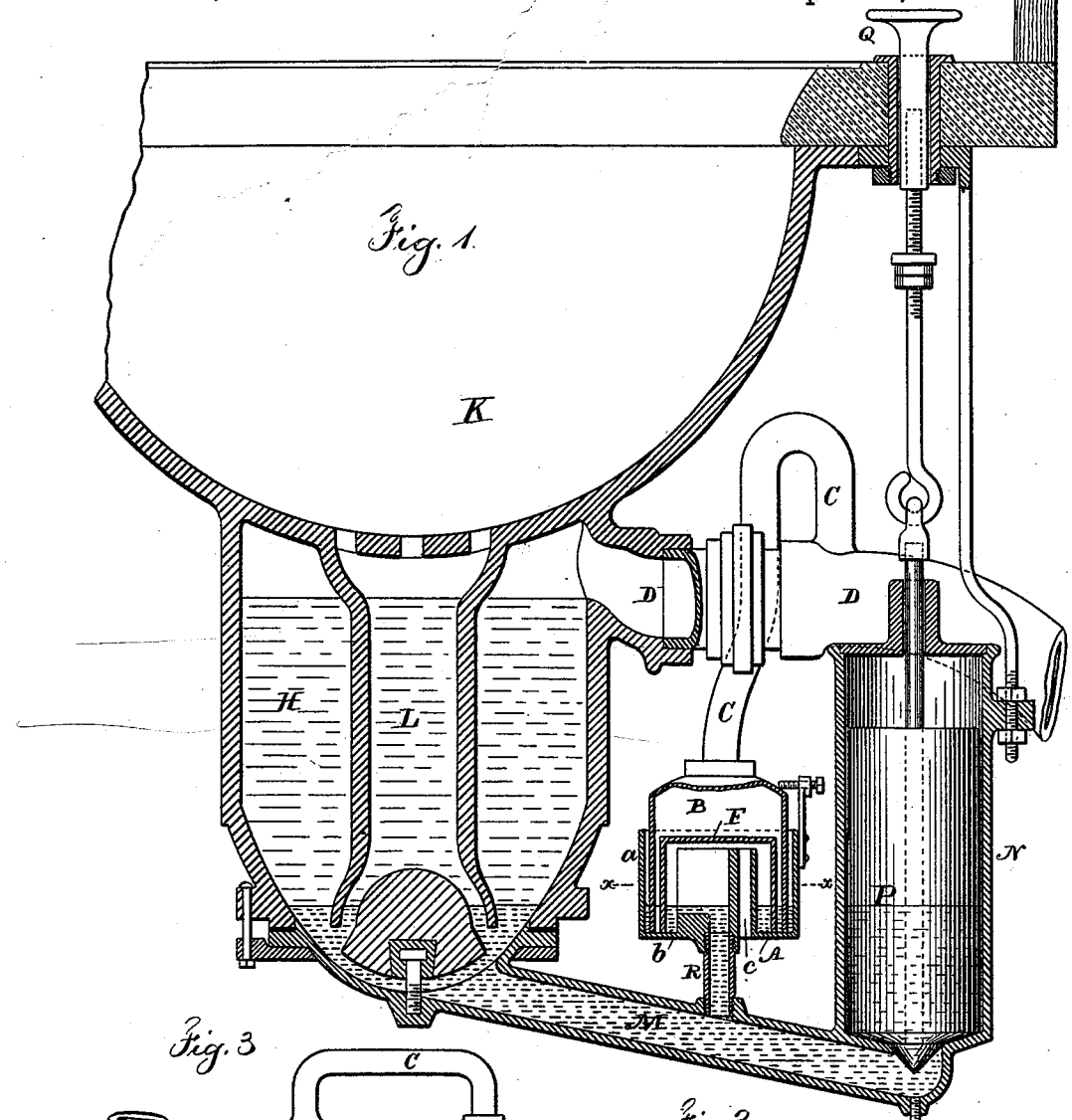
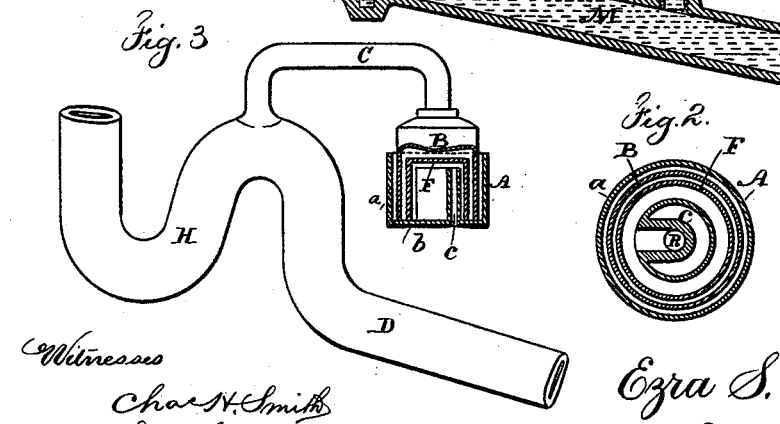

UNITED STATES PATENT OFFICE.

EZRA S. McCLELLAN, OF PATERSON, NEW JERSEY.

AIR-INLET AND SEAL FOR WASTE-PIPES AND TRAPS.

SPECIFICATION forming part of Letters Patent No. 339,800, dated April 13, 1886.

Application filed January 2, 1886. Serial No. 187,348. (No model.)

*To all whom it may concern:*

Be it known that I, EZRA S. MCCLELLAN, of Paterson, in the county of Passaic and State of New Jersey, have invented an Improvement in Air-Inlets and Seals for Waste-Pipes and Traps, of which the following is a specification.

My improvement is for admitting air to the traps of basins, water-closets, &c., when the descending column of water tends to siphon out the trap, and thereby prevent the air drawing through or forcing out the contents of the trap, and this air-valve effectually closes the air-inlet against any back-pressure in the sewer-pipe.

In the drawings, Figure 1 is a vertical section showing my improvement as applied to a basin-trap. Fig. 2 is a sectional plan at the line *x x*, and Fig. 3 is a sectional elevation of my improvements as applied to an ordinary trap for a basin or closet.

The case A is made with a cylindrical exterior, *a*, and a bottom, *b*, and a rising air-inlet pipe, *c*, passing up through the bottom, and there is a bell-shaped cylinder, B, from the top of which a pipe, C, passes to the sewer or discharge side of the trap H. The cylinder B is placed within the cylinder *a*, and its lower end is immersed in mercury contained in the vessel A, and within the bell-shaped cylinder B is an air-valve, F, formed as an inverted cylindrical cup, the lower edge of which passes into the mercury and rests upon the bottom *b*. The air-inlet tube *c* rises up within this cup-shaped valve F, so as to be at the proper height above the surface of the mercury. It will now be understood that the water or other material flowing off to the sewer by the pipe D sometimes produces a partial vacuum, and if air is not admitted into such pipe D the contents of the trap H will be displaced, or partially so, and a noise produced by drawing air into the sewer-pipe, and sometimes, with ordinary traps, the water will be drawn out by a siphoning action. My present improvement prevents this difficulty, because as soon as there is a minus pressure or partial vacuum the pressure of the air acting beneath the cup-valve F lifts the same, and the air draws in beneath its lower edge, and passes into the pipe C and waste-pipe D, to equalize the pressure and prevent the formation of a partial vacuum; but as soon as the equilibrium in the pressure is restored the inverted-cup valve F drops to its normal position in the mercury seal, and no gases can escape, because the column of mercury forced up between the cup F and the cylindrical bell B resists the pressure of the sewer-gases.

My improvement may be used with any desired character of waste-pipe or sewer-trap— such, for instance, as that shown in Fig. 3. I have, however, shown the same in Fig. 1 as connected with a basin and mercury seal. The basin K has a tubular discharge-pipe, L, passing down within the trap H, and there is a mercury-pipe, M, leading to the cylinder N, in which is a displacer, P, and a handle, Q, passes up through an opening in the basin-slab, and the pipe R connects the pipe M with the bottom *b* of the vessel A. The position of the vessel A and air-valve F is such in relation to the mercury-space in the trap H that the pipe R and lower part of the vessel A will be filled with mercury to the proper level; but the upper end of the pipe R is sufficiently above the bottom of the vessel A to insure the retention in said vessel A of the proper depth of mercury to maintain the seal for the valve F when the seal of the trap is open.

When the displacer P is raised, the mercury will run out of the trap H into the vessel N, and allow the contents of the basin K to escape through the trap H and waste-pipe D, and when the displacer P is dropped the valve at the lower end of the displacer-stem almost closes the opening leading to the pipe M, and the mercury is gradually forced out from the vessel P and rises in the trap H. The advantage of connecting the mercury in the trap with the mercury of the air-valve before described is, that when the displacer P is depressed the level of the mercury will be raised both in the trap H, vessel A, and pipe R, and the reverse; hence the seal of the valve is always equal in height to the seal of the trap when closed, and a sufficient seal is preserved in the valve-case when the seal of the trap is open, and the supply of mercury is automatic in the valve-case.

The air-valve will rise freely to admit air into the sewer-pipe when there is a minus pressure in the sewer-pipe, because the valve will lift without the level of the column of mercury inside and outside, the cylinder of the valve being materially changed by the action of the air, which lifts the valve out of the mercury.

I claim as my invention—

1. The combination, with the vessel A and inlet air-pipe c, of the bell-shaped cylinder B and pipe C, leading to the waste-pipe D, and the inverted-cup-shaped valve F within the cylinder B, and the mercury seal, into which the lower end of the valve F passes, substantially as set forth.

2. The combination, with the vessel A, air-inlet pipe c, and cylinder B, of the pipe C, leading to the waste-pipe D, and the inverted-cup-shaped valve F, the trap H, the pipe M, leading from the bottom of the trap, the mercury-vessel N, the displacer P, and the pipe R, leading from the vessel A to the pipe M, whereby the mercury seal in the vessel A is raised and lowered simultaneously with the mercury seal in the trap H, substantially as set forth.

3. A vessel containing mercury, an inverted-cup-shaped air-valve, with the lower part thereof in the mercury, an air-inlet within the cup-shaped valve, a case, and a pipe to connect with a sewer or drain pipe, substantially as set forth.

Signed by me this 22d day of December, A. D. 1885.

EZRA S. McCLELLAN.

Witnesses:
GEO. T. PINCKNEY,
WILLIAM G. MOTT.